(12) United States Patent
Bumby et al.

(10) Patent No.: US 12,276,345 B2
(45) Date of Patent: Apr. 15, 2025

(54) VALVE

(71) Applicant: Lee Ventus Ltd., Melbourn (GB)

(72) Inventors: James Samuel Bumby, Melbourn (GB); Stuart Andrew Hatfield, Melbourn (GB)

(73) Assignee: LEE VENTUS LTD., Melbourn (GB)

( * ) Notice: Subject to any disclaimer, the term of this patent is extended or adjusted under 35 U.S.C. 154(b) by 0 days.

(21) Appl. No.: 18/124,113

(22) Filed: Mar. 21, 2023

(65) Prior Publication Data

US 2023/0323970 A1  Oct. 12, 2023

(30) Foreign Application Priority Data

Mar. 23, 2022 (GB) ..................................... 2204116

(51) Int. Cl.
*F16K 15/14* (2006.01)
*F04B 53/10* (2006.01)
*F16K 25/04* (2006.01)

(52) U.S. Cl.
CPC ........ *F16K 15/144* (2013.01); *F04B 53/1047* (2013.01); *F16K 25/04* (2013.01)

(58) Field of Classification Search
CPC ..... F16K 15/144; F16K 25/04; F04B 53/1047
See application file for complete search history.

(56) References Cited

U.S. PATENT DOCUMENTS 3,670,071 A * 6/1972 Walchle .............. F16K 27/0209
264/273
2009/0277166 A1* 11/2009 Walz ...................... F02M 26/70
60/324

FOREIGN PATENT DOCUMENTS

| GB | 2583688 A | 11/2020 |
|----|-----------|---------|
| WO | 2006111775 A1 | 10/2006 |
| WO | 2010139917 A1 | 12/2010 |
| WO | 2020128426 A1 | 6/2020 |

* cited by examiner

*Primary Examiner* — P. Macade Nichols
(74) *Attorney, Agent, or Firm* — CANTOR COLBURN LLP

(57) ABSTRACT

A valve for controlling fluid flow, the valve comprising: a first plate comprising a plurality of first holes extending through said first plate; a second plate comprising a plurality of second holes extending through said second plate, the second holes being substantially offset from the first holes of said first plate; wherein said first plate and said second plate are arranged to form a cavity therebetween in fluid communication with the first holes of said first plate and the second holes of said second plate; and a flap disposed and moveable between said first plate and said second plate, said flap having holes substantially offset from the first holes of said first plate and substantially aligned with the second holes of said second plate; wherein said flap is operable to be motivated between said first and second plates in response to a change in direction of differential pressure of the fluid across the valve; wherein said first plate comprises a coating disposed on a surface of the first plate; wherein the first plate comprises a plurality of clearance regions, substantially aligned with the holes of the flap, in which a thickness of the coating is reduced; and wherein each of the clearance regions defines a respective inner region in which a thickness of the coating is generally greater than its defining clearance region.

20 Claims, 12 Drawing Sheets

VALVE

CROSS-REFERENCE TO RELATED APPLICATIONS

This application claims the benefit of GB Application No. 2204116.4, filed Mar. 23, 2022, which is incorporated by reference herein in its entirety.

Field of the Invention

The illustrative embodiments relate generally to a valve for controlling fluid flow therethrough and, more specifically, to an improved valve having a flap that is disposed between two plates and capable of movement between an open and closed position.

Background

Many portable electronic devices, including medical devices, require pumps for delivering a positive pressure or providing a vacuum that are relatively small in size, and it is advantageous for such pumps to be inaudible in operation so as to provide discrete operation. To achieve the desired objectives of small size, high efficiency, and inaudible operation, such pumps must operate at very high frequencies, in turn requiring valves that must operate at very high frequencies to be effective, typically of around 20 kHz and higher. One such high frequency pump, having a substantially disc-shaped cavity with a high aspect ratio, i.e., the ratio of the radius of the cavity to the height of the cavity, is disclosed in international patent publication WO 2006/111775, the entire contents of which are herein incorporated by reference.

To operate at these high frequencies, the valve must be responsive to a high frequency oscillating pressure that can be rectified to create a net flow of fluid through the pump. One such valve that is suitable for operating at frequencies of 20 kHz, and higher, is described in international patent publication WO 2010/139917, the entire contents of which are herein incorporated by reference.

Valve design may be optimised to minimise flow restriction, and to maximise valve response time and longevity. Small valve holes are desirable for reducing valve fatigue; however, fabricating small holes by chemical etching, or other means, often result in sharp corners and rough edges, which can cause the valve flap to wear away when it impacts or contacts the valve plate at the edge of the hole, especially if a relatively thin valve flap has been chosen for fast valve response. Existing valve designs have addressed this by providing a coating on the valve plates, which can minimise and/or inhibit wear and fatigue of the flap by reducing the rate of deceleration of the flap when it contacts the valve plate, particularly around the holes on the valve plate. The coating may be selectively applied to the valve plate, in order to increase the valve performance.

However, applying a coating to selective areas of the valve plates can negatively impact valve manufacture. For example, the process of removing coating in selected areas can be slow and expensive. It can also result in manufacturing faults in the valves themselves, as well as damage and/or increased maintenance requirements for manufacturing equipment.

The present invention therefore aims to provide an improved valve and method of valve manufacture that mitigates these issues.

SUMMARY OF THE PRESENT INVENTION

In a first aspect there is provided a valve for controlling fluid flow, the valve comprising: a first plate comprising a plurality of first holes extending through said first plate; a second plate comprising a plurality of second holes extending through said second plate, the second holes being substantially offset from the first holes of said first plate; wherein said first plate and said second plate are arranged to form a cavity therebetween in fluid communication with the first holes of said first plate and the second holes of said second plate; and a flap disposed and moveable between said first plate and said second plate, said flap having holes substantially offset from the first holes of said first plate and substantially aligned with the second holes of said second plate; wherein said flap is operable to be motivated between said first and second plates in response to a change in direction of differential pressure of the fluid across the valve; wherein said first plate has a coating, disposed on a surface of the first plate; wherein the first plate comprises a plurality of clearance regions, substantially aligned with the holes of the flap, in which a thickness of the coating is reduced; and wherein each of the clearance regions defines a respective inner region of the first plate in which a thickness of the coating is generally greater than its defining clearance region.

The plurality of clearance regions may be arranged to inhibit contact between edges of the holes of the flap and the coating. The plurality of clearance regions may be arranged to inhibit contact between edges of the holes of the flap and the coating during formation of the holes.

Each of the clearance regions may be substantially aligned with a respective hole of the flap and shaped to complement said respective hole of the flap. The respective hole of the flap may be substantially circular in shape and each clearance region may be substantially annular in shape to complement the respective hole.

The thickness of the coating in the inner region may be substantially the same as the thickness of the coating outside of the clearance region.

For each clearance region, an outer diameter of the clearance region may be greater than a diameter of a respective hole of the flap with which the clearance region is substantially aligned.

For each inner region, a diameter of the inner region may be less than a diameter of a respective hole of the flap with which the inner region is aligned.

In each clearance region, the thickness of the coating may be zero.

Each inner region may comprise at least one island of coating isolated from the rest of the coating by its defining clearance region.

The coating may be less hard than the flap.

The coating may be arranged to control the distribution of one or more forces asserted on said flap when said flap impacts or is in contact with said first plate by controlling the areas of the flap over which said forces are asserted to inhibit wear of said flap at said areas.

The areas of the flap over which said forces are asserted may be areas of said flap that impact or contact regions of said first plate adjacent said first holes.

The coating may extend at least partially into the holes of said first plate to cover at least part of an internal surface of said holes.

The thickness of the coating may be less than 100 μm, preferably less than 10 μm, and preferably around 4 μm.

The coating may comprise a polymer, for example a soft polymeric material, and preferably may comprise Parylene.

Each clearance region may lie between the holes in the first plate such that the coating surrounds said holes.

Each clearance region may comprise one or more separate sub-regions.

In a second aspect there is provided a pump comprising at least one valve according to any of the aspects above.

In a third aspect there is provided a method of providing a first plate for a valve according to any the above aspects, the method comprising: applying the coating onto the surface of said first plate; at least partially removing the coating in each of the clearance regions of the first plate to form the plurality of clearance regions, substantially aligned with the holes of the flap, in which a thickness of the coating is reduced; and retaining the coating in each of the inner regions defined by the respective clearance regions, in order that a thickness of the coating is generally greater in each inner region than its defining clearance region.

BRIEF DESCRIPTION OF THE DRAWINGS

Aspects and embodiments of the present invention will now be described, by way of example only, with reference to the accompanying drawings, in which.

SPECIFIC DESCRIPTION

Figure 1:
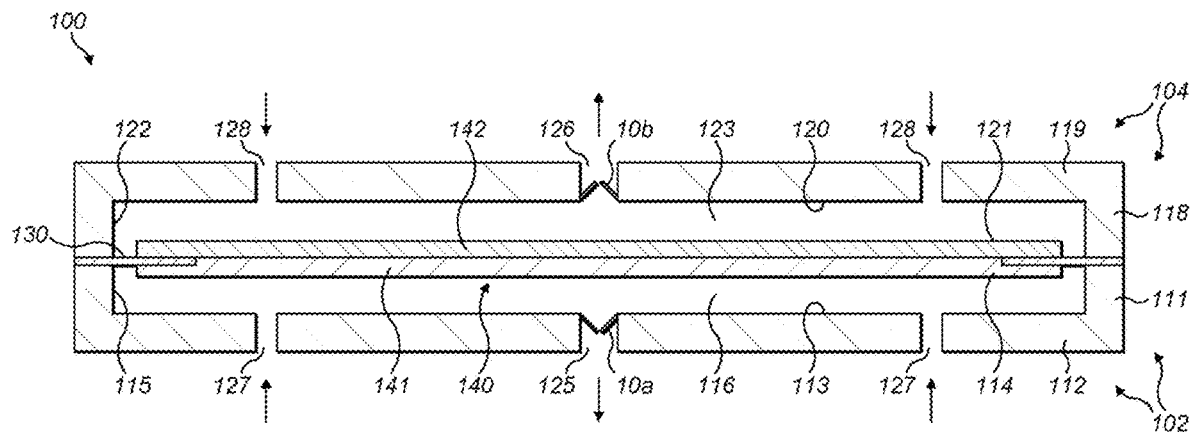
FIG. 1 shows a schematic cross-section of a two-cavity pump.

In the following description and accompanying drawings, corresponding features of different embodiments are, preferably, identified using corresponding reference numerals.

To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

FIG. 1 is a schematic cross-section of a pump 100 having two separate cavities 116, 123. The pump 100 comprises a first pump body 102 having a substantially cylindrical shape including a cylindrical wall 111 closed at one end by a (first) base 112 and closed at the other end by an end plate 141 and a ring-shaped isolator 130 disposed between the end plate 141 and the other end of the cylindrical wall 111 of the first pump body. The cylindrical wall 111 and base 112 may be a single component comprising the first pump body 102.

Pump 100 also comprises a second pump body 104 having a substantially cylindrical shape including a cylindrical wall 118 closed at one end by a (second) base 119 and closed at the other end by a piezoelectric disc 142 and the ring-shaped isolator 130 disposed between the end plate 142 and the other end of the cylindrical wall 118 of the second pump body. The cylindrical wall 118 and base 119 may be a single component comprising the second pump body 104.

The first pump body 102 and the second pump body 104 may be mounted to other components or systems.

The internal surfaces of the cylindrical wall 111, the base 112, the end plate 141, and the isolator 130 form a first cavity 116 within the pump 100 wherein said first cavity 116 comprises a side wall 115 closed at both ends by end walls 113, 114. The end wall 113 is the internal surface of the base 112 and the side wall 115 is the inside surface of the cylindrical wall 111. The end wall 114 comprises a central portion corresponding to a surface of the end plate 141 and a peripheral portion corresponding to a first surface of the isolator 130. Although here the first cavity 116 is substantially circular in shape, the first cavity 116 may also be elliptical or other suitable shape.

The internal surfaces of the cylindrical wall 118, the base 119, the piezoelectric disc 142, and the isolator 130 form a second cavity 123 within the pump 100 wherein said second cavity 123 comprises a side wall 122 closed at both ends by end walls 120, 121. The end wall 120 is the internal surface of the base 119 and the side wall 122 is the inside surface of the cylindrical wall 118. The end wall 121 comprises a central portion corresponding to the inside surface of the piezoelectric disc 142 and a peripheral portion corresponding to a second surface of the isolator 130. Although the second cavity 123 is substantially circular in shape, the second cavity 123 may also be elliptical or other suitable shape. The cylindrical walls 111, 118 and the bases 112, 119 of the first and second pump bodies may be formed from any suitable rigid material including, without limitation, metal, ceramic, glass, or plastic.

The piezoelectric disc 142 is operatively connected to the end plate 141 to form an actuator 140 that is operatively associated with the central portion of the end walls 114, 121 via the end plate 141 and the piezoelectric disc 142. The piezoelectric disc 142 is not required to be formed of a piezoelectric material, but may be formed of any electrically active material such as, for example, an electrostrictive or magnetostrictive material. As such, the term "piezoelectric disc" is intended to cover electrostrictive or magnetostrictive discs as well. The end plate 141 preferably possesses a bending stiffness similar to the piezoelectric disc 142 and may be formed of an electrically inactive material such as a metal or ceramic. When the piezoelectric disc 142 is excited by an oscillating electrical current, the piezoelectric disc 142 attempts to expand and contract in a radial direction relative to the longitudinal axis of the cavities 116, 123 causing the actuator 140 to bend, thereby inducing an axial deflection of the end walls 114, 121 in a direction substantially perpendicular to the end walls 114, 121. The end plate 141 alternatively may also be formed from an electrically active material such as, for example, a piezoelectric, magnetostrictive, or electrostrictive material. In another embodiment, the actuator 140 may be replaced by a single plate in force-transmitting relation with an actuation device, for example, a mechanical, magnetic or electrostatic device, wherein said plate forms the end walls 114, 121 and said plate may be formed as an electrically inactive or passive layer of material driven into oscillation by such device (not shown) in the same manner as described above.

In use, the axial deflection of the end walls 114, 121 generate substantially proportional "pressure oscillations" of fluid within the cylindrical cavities 116, 123, creating a radial pressure distribution approximating that of a Bessel function of the first kind as described in WO 2006/111775 and WO 2010/139917.

The pump 100 further comprises at least two apertures extending from the first cavity 116 to the outside of the pump 100, wherein at least one of the apertures may contain a valve to control the flow of fluid through the aperture. Although the aperture containing a valve may be located at any position in the cavity 116 where the actuator 140 generates a pressure oscillation as described below in more detail, one preferred embodiment of the pump 100 comprises an aperture with a valve located at approximately the centre of the end wall 113. The pump 100 shown in FIG. 1 comprises a primary aperture 125 extending from the cavity 116 through the base 112 of the pump body at about the centre of the end wall 113 and containing a valve 10a. The valve 10a is mounted within the primary aperture 125 and permits the flow of fluid in one direction as indicated by the arrow so that it functions as an outlet for the pump 100. The open aperture 127 may be located at any position within the cavity 111 other than the location of the aperture 125 with the valve 10a. In one preferred embodiment of the pump 100, the open aperture is disposed offset from the centre of the end wall 113. The embodiment of the pump 100 shown in FIG. 1 comprises two secondary apertures 127 extending from the cavity 116 through the base 112 that are disposed offset from the centre of the end wall 113.

The pump 100 further comprises at least two apertures extending from the second cavity 123 to the outside of the pump 100, wherein at least a first one of the apertures may contain a valve to control the flow of fluid through the aperture. Although the aperture containing a valve may be located at any position in the cavity 123 where the actuator 140 generates a pressure oscillation as described below in more detail, one preferred embodiment of the pump 100 comprises an aperture with a valve located at approximately the centre of the end wall 120. The pump 100 shown in FIG. 1 comprises a primary aperture 126 extending from the cavity 123 through the base 119 of the pump body at about the centre of the end wall 120 and containing a valve 10b. The valve 10b is mounted within the primary aperture 126 and permits the flow of fluid in one direction as indicated by the arrow so that it functions as an outlet for the pump 100. The open aperture 128 may be located at any position within the cavity 123 other than the location of the aperture 126 with the valve 10b. In one preferred embodiment of the pump 100, the open aperture is disposed offset from the centre of the end wall 120. The embodiment of the pump 100 shown in FIG. 1 comprises two secondary apertures 128 extending from the cavity 123 through the base 119 that are disposed offset from the centre of the end wall 120.

Although the secondary apertures 127, 128 are not valved in this embodiment of the pump 100, they may also be valved to improve performance if necessary. In this embodiment of the pump 100, the primary apertures 125, 126 are valved so that the fluid is drawn into the cavities 116, 123 of the pump 100 through the secondary apertures 127, 128 and pumped out of the cavities 116, 123 through the primary aperture 125, 126 as indicated by the arrows.

The valves 10a, 10b allow fluid to flow through in substantially one direction as described above. The valves 10a, 10b may be a ball valve, a diaphragm valve, a swing valve, a duck-bill valve, a clapper valve, a lift valve, or any other type of check valve or any other valve that allows fluid to flow substantially in only one direction. Some valve types may regulate fluid flow by switching between an open and closed position. For such valves to operate at the high frequencies (e.g. 20 KHz, and higher) generated by the actuator 140, the valves 10a, 10b must have an extremely fast response time such that they are able to open and close on a timescale significantly shorter than the timescale of the pressure variation. One embodiment of the valves 10a, 10b achieves this by employing an extremely light flap valve which has low inertia and consequently is able to move rapidly in response to changes in relative pressure across the valve structure.

Figure 2A:
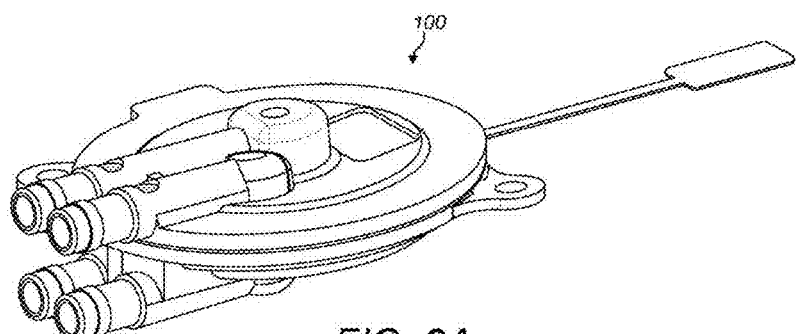
FIGS. 2A and 2B show an embodiment of the two-cavity pump of FIG. 1.
Figure 2B:
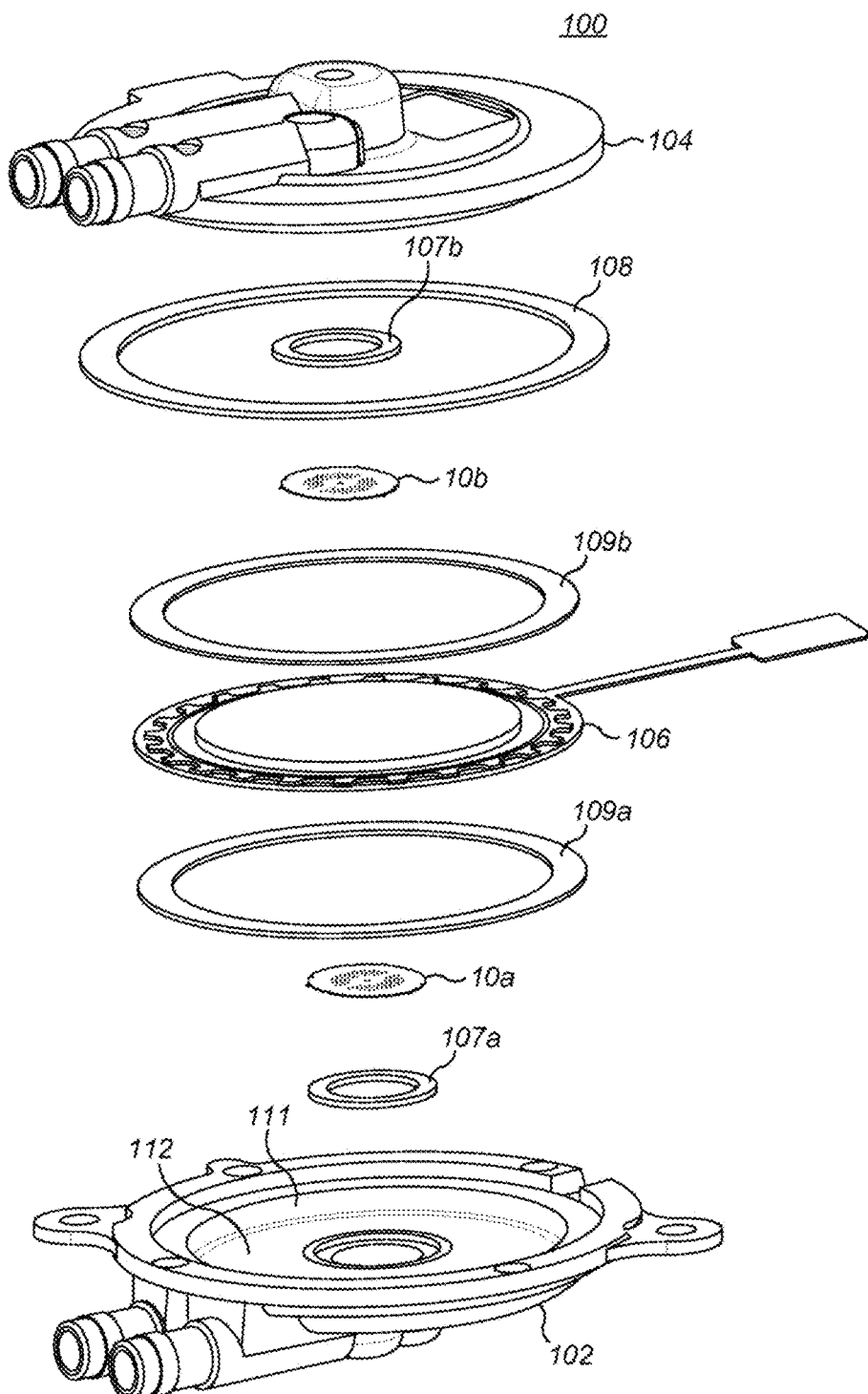

FIGS. 2A and 2B show an exemplary embodiment of the schematic pump 210 described in FIG. 1. FIG. 2A shows the pump 100 assembled, while FIG. 2B shows an exploded view of the pump 100. The pump 100 comprises a first (or "lower") pump body 102 and a second (or "upper") pump body 104. The first pump body 102 incorporates the cylindrical wall 111, base 112, unvalved aperture 128 and the valved aperture 126. Similarly, the second pump body 104 incorporates the cylindrical wall 118, base 129, unvalved aperture 127 and the valved aperture 125. The pump bodies 102, 104 may be formed from any suitable rigid material including, but not limited to, metal, ceramic, glass or plastic. The pump bodies 102, 104 may also be made by any suitable process including moulding, machining, casting, additive manufacturing or laminate assembling. In one particular embodiment they may be formed of moulded polyarylamide, such as IXEF™.

The pump 100 further comprises an actuator assembly 106, comprising the actuator 140 and the isolator 130, and may include features such as roughened surfaces or apertures to allow adhesive to key into the isolator 130 in order to improve the bonding of the isolator to the pump bodies 102, 104. The actuator assembly 106 may be located between the first bump body 102 and the second pump body 104 in order to create a first cavity 116 and a second cavity 123 between the actuator assembly 106 and the first and second pump bodies 102, 104 respectively.

Two valve bonding features 107a, 107b form a bond and pneumatic seal between the first valve 10a and the first pump body 102 and the second valve 10b and second pump body 104 respectively. A further pump body bonding feature 108 forms a bond and pneumatic seal between the first pump body 102 and second pump body 104. The bonding features 107a, 107b, 108 may be, for example, an adhesive or a UV curing adhesive or may be replaced by alternative materials or processes including pressure sensitive adhesive, welding, ultrasonic welding, heat sealing or soldering.

The pump 100 also comprises two isolator clamping features 109a, 109b which trap the isolator 130, of the actuator assembly 106, between the first pump body 102 and the second pump body 104. In addition to the materials and processes used in relation to the valve bonding features 107a, 107b, 108 the isolator clamping features 109a, 109b may also provide compression instead of a physical bond by using, for example, compressible materials such as foam or silicone.

In the exemplary "two-cavity" pump 100 described above, the two cavities 116, 123 may be considered as separate pumping units, albeit driven by the same actuator and therefore not independently controllable. These two pumping units may be connected in series or parallel in order to deliver increased pressure or increased flow respectively through the use of an appropriate manifold (as shown later). Such manifold may be separate components or be incorporated into the pump body components 102 and 104 to facilitate assembly and to reduce the number of parts required in order to assemble the pump 100.

In the illustrative example of a pump 100 in FIG. 2, four external pneumatic connections are provided to the pump 100, which connect to the valved apertures 125, 126 and unvalved apertures 127, 128. This allows different pump configurations to be achieved by connecting various external manifolds and configuring the valves to control flow in certain directions, as will be described in more detail further on.

The term "reduced pressure" as used herein generally refers to a pressure less than the ambient pressure where the pump 100 is located. Although the term "vacuum" and "negative pressure" may be used to describe the reduced pressure, the actual pressure reduction may be significantly less than the pressure reduction normally associated with a complete vacuum. The pressure is "negative" in the sense that it is a gauge pressure, i.e., the pressure is reduced below ambient atmospheric pressure. Unless otherwise indicated, values of pressure stated herein are gauge pressures. References to increases in reduced pressure typically refer to a decrease in absolute pressure, while decreases in reduced pressure typically refer to an increase in absolute pressure.

Figure 3A:
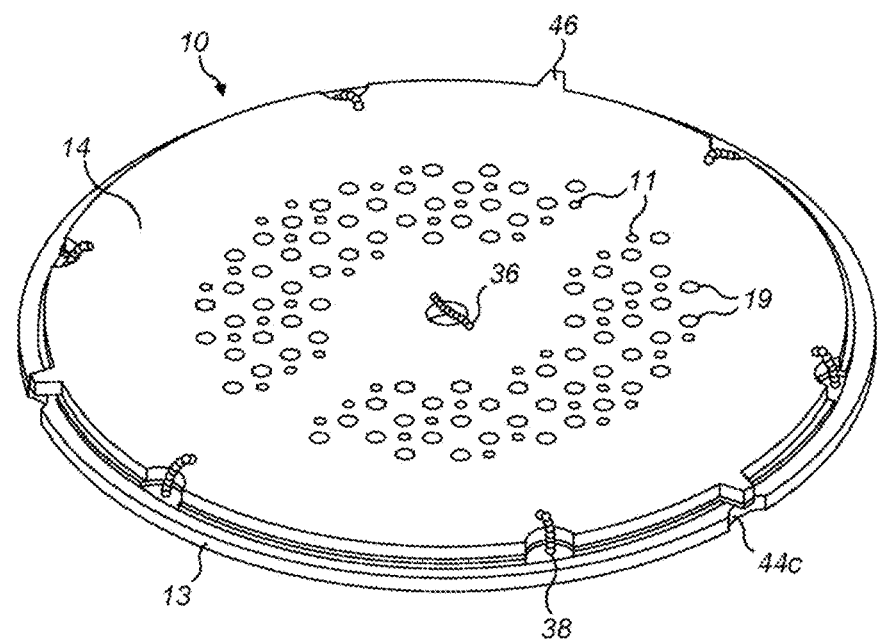
FIGS. 3A and 3B show a valve for the pump in FIG. 2.

A valve 10, such as one generally taught in WO 2010/139917, is shown in FIG. 3A. The valve 10 comprises a substantially cylindrical wall 13 that is ring-shaped (e.g. annular) closed at one end by a first plate 16 (e.g. a "sealing" plate) and at the other end by a second plate 14 (e.g. a "retention" or "open" plate) such that the sealing plate 16 and open plate 14 are spaced apart by the ring-shaped wall 13. The ring-shaped wall 13 therefore functions as a spacer between the sealing plate 16 and open plate 14. The inner surfaces of the ring-shaped wall 13 and the two plates 14, 16 form a valve cavity 12 within the valve 10 in which is disposed a substantially circular (valve) flap 18, which is movable between the two plates 14, 16.

Figure 3B:
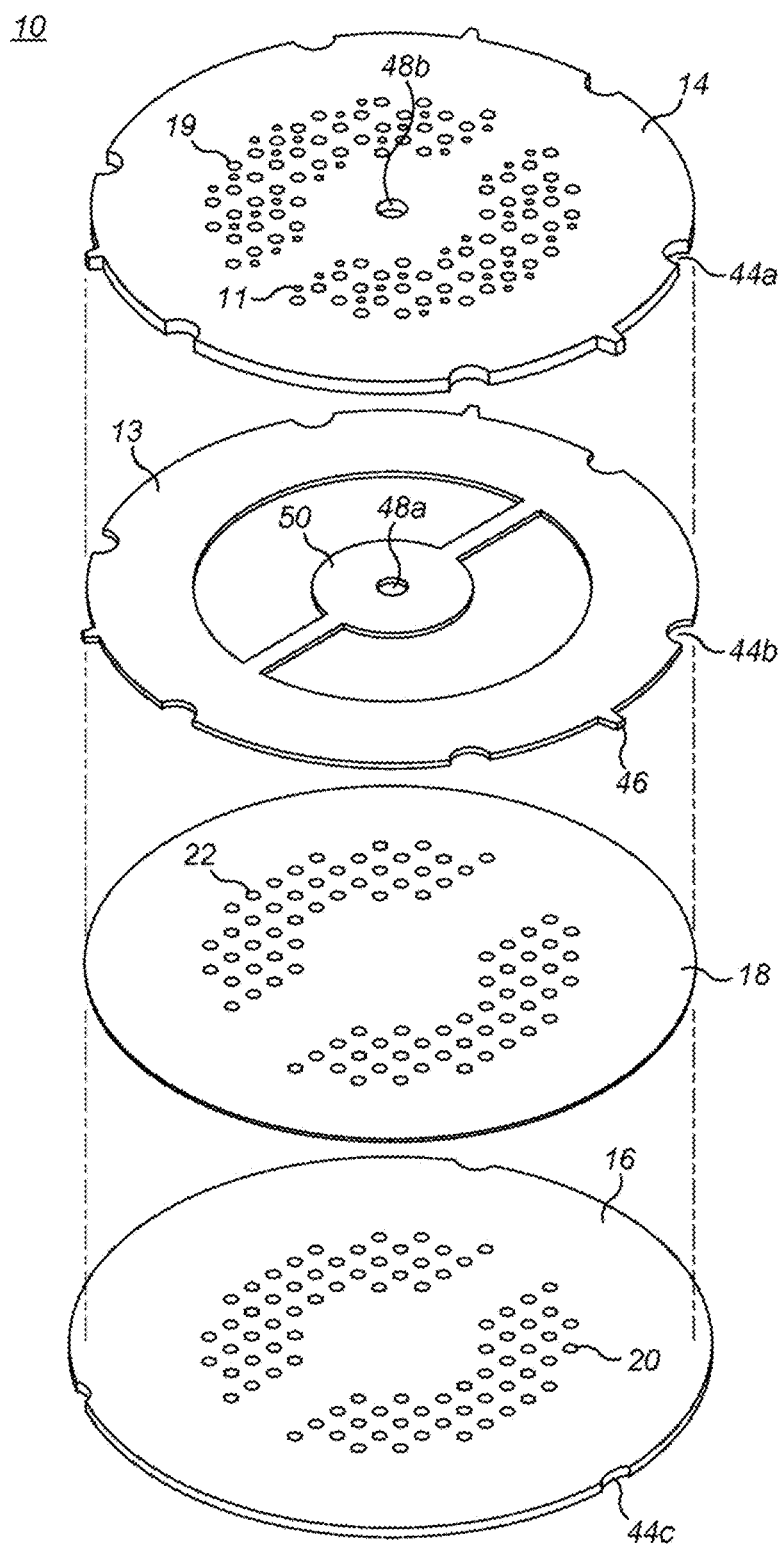

FIG. 3B shows an exploded view of the valve 10, in which the flap 18 is located adjacent the sealing plate 16, though the flap 18 may alternatively be disposed adjacent the open plate 14 in an alternative embodiment, and in this sense the flap 18 is considered to be "biased" against either one of the sealing plate 16 or open plate 14.

The peripheral portion of the flap 18 is sandwiched between the sealing plate 16 and the ring-shaped wall 13 so that the motion of the flap 18 is restrained in the plane substantially perpendicular the surface of the flap 18. The motion of the flap 18 in such plane may also be restrained by the peripheral portion of the flap 18 being attached directly to either the sealing plate 16 or the ring-shaped wall 13, or by the flap 18 being a close fit within the ring-shaped wall 13, in alternative embodiments. The remainder of the flap 18 is sufficiently flexible and movable in a direction substantially perpendicular the surface of the flap 18, so that a force applied to either surface of the flap 18 will motivate the flap 18 between the sealing plate 16 and the open plate 14.

Each of the open plate 14 and sealing plate 16 has a plurality of holes 19, 20 respectively, which extend through each plate 14, 16. The holes 19, 20 in the respective plates 14, 16 are offset from each other such that none of the holes 19 of the open plate 14 align with the holes 20 of the sealing plate 16. The flap 18 also has a plurality of holes (or "apertures") 22, which are generally aligned with the holes 19 of the open plate 14 to provide a passage through which fluid, including a gas or liquid, may flow.

Although the holes 19, 20, 22 are shown to be of substantially uniform size and shape, they may be of different diameters or even different shapes. The pattern of holes 19, 20, 22 may be designed to increase or decrease the number of holes to control the total flow of fluid through the valve 310 as required. For example, the number of holes 19, 20, 22 may be increased to reduce the flow resistance of the valve 10.

The open plate 14 may also include additional release holes 11. The presence of these release holes 11 helps to enable the valve flap 18 to accelerate away from the valve open plate 14 quickly when the differential pressure across the valve changes sign appropriately, thereby helping to minimise the response time of the valve.

In use, the flap 18 is motivated between the plates 14, 16 in response to a change in direction of the differential pressure of fluid across the valve 10, which thereby effectively controls the flow of fluid through the valve 10, and provides rectification of the alternative pressure wave created in the pump cavity.

The four components of the valve 10 may be fixed or connected together by any suitable method including gluing, soldering, electrical spot-welding or seam-welding, or laser spot-welding or seam-welding. A complicating factor is the presence of the valve flap 18 which may be a thin polymer layer as described above that can hinder many of these methods. In particular, the polymer layer acts as an electrical and thermal insulating layer which can hinder any one of these bonding methods. A preferred method for connecting the components of the valve 10 is laser spot-welding, as it forms an extremely strong and durable bond, and further enables accurate control of the gap between the sealing plate 16 and open plate 14. A factor in the quality of such a laser welding process is the degree of contact between the components being welded. In order to achieve a good weld, the parts should be suitably clamped to ensure good contact and therefore good heat transfer between layers.

Another feature of the valve 10 is the centre shim 50 which includes an opening or hole 48a positioned generally at the centre of the flap 18. The open plate 14 comprises a similar hole (or opening) 48b that is substantially concentric with the hole 48a when the open plate 114 is positioned on top of the cylindrical walls 18. The holes 19, 20 and 22 of the open plate 14, the sealing plate 16, and the valve flap 18, respectively, are arranged on either side of the centre shim 50. The centre shim 50 provides additional support between the open plate 14 and the sealing plate 16, and the holes 48a, 48b provide an opening for a centre drag weld 36 to be formed at the centre of the valve 10 to further reinforce the open plate 14 and the sealing plate 16. The centre weld 36 may be formed in the same fashion as the peripheral welds 38.

An additional feature of the valve 10 is the "singulation tabs" 46 where the valve assembly has been removed from the leadframes used to support the individual open plate 14, sealing plate 16 and cylindrical wall 13 during assembly. These singulation tabs may be removed by applying an electrical potential difference between the valve and leadframe such that a high current passes through the high electrical resistance singulation tabs, resulting in them "fusing" out. Alternative methods for separating the valve from the leadframe include, but are not limited to cutting, shearing, drilling and laser machining.

The open plate 14 and sealing plate 16 may be fabricated by a wide range of methods including but not limited to etching, machining, moulding, electroforming or laser drilling.

Figure 4A:
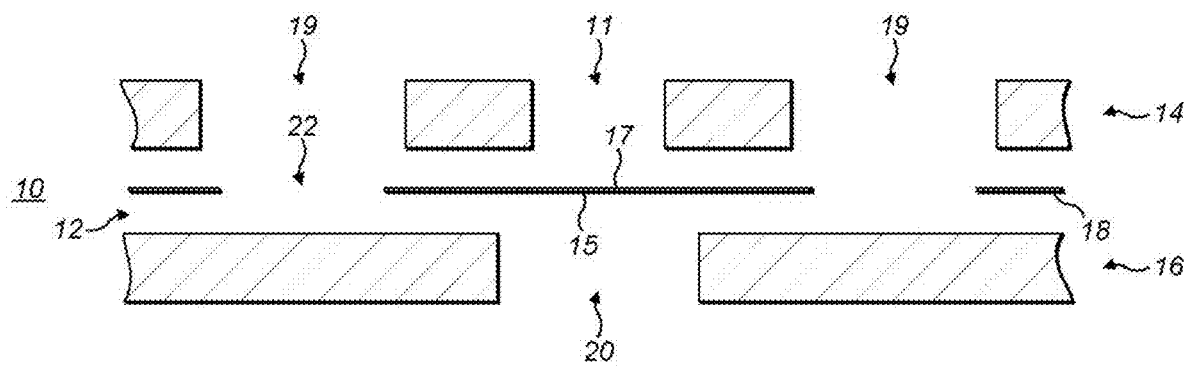
FIGS. 4A to 4C show schematic cross-section views of a valve in a neutral open position, a closed position and an open position, respectively.

A close-up cross-section of an exemplary valve 10 is shown in FIG. 4A, to illustrate a problem with existing valves. As described above, both the open plate 14 and the sealing plate 16 have a number of holes (or "apertures") 19, 20, which extend through each plate 14, 16. The flap 18 is shown in a neutral position between the two plates 14, 16 with the flap 18 having a first ("upper"), surface 17 and a second ("lower") surface 15. The first and second surfaces 17, 15 are opposed, on either side of the flap, each facing towards a respective plate 14, 16. The terms "upper" and "lower" are not to be considered to be limiting to the orientation of the valve 10 and its components, but are merely being used to aid understanding of the configuration.

At least one release hole 11 is also provided in the open plate 14 to help the valve flap 18 release from the open plate 14 when fluid pressure is asserted on the top surface 17 of the valve flap 18 (i.e. to help the flap 18 move from the open position to the closed position). The release hole 11 ensures that at least a portion of the valve flap 18 is exposed to the fluid pressure so that the flap 18 can be motivated between the open and closed positions. Without the release hole 11, there is a chance that no part of the valve flap 18 would be exposed to the fluid pressure because, in general, the holes 22 in the valve flap 18 are configured to align with the holes 19 in the open plate 14. That is, the release hole 11 ensures that there is at least one hole in the open plate 14 which is not aligned with a valve flap hole 22.

Figure 4B:
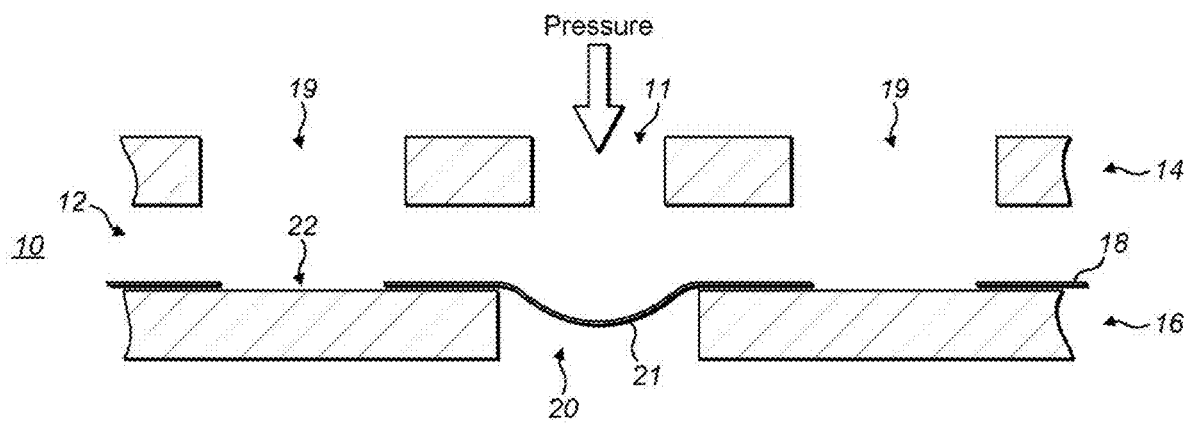

When a force, such as that caused by pressure differential across the valve 10, is asserted on the first surface 17 of the flap 18, the flap 18 is motivated towards the sealing plate 16. The valve 10 is then in a "closed" position because the flap 18 is held against the sealing plate 16 as a result of the force being asserted on it with the holes 22 of the flap 18 not aligned with the holes 20 of the sealing plate 16. In this "closed" position, the flow of fluid through the sealing plate 16 is substantially blocked or covered by the main body (i.e. the non-perforated portions) of the flap 18, as shown in FIG. 4B.

Figure 4C:
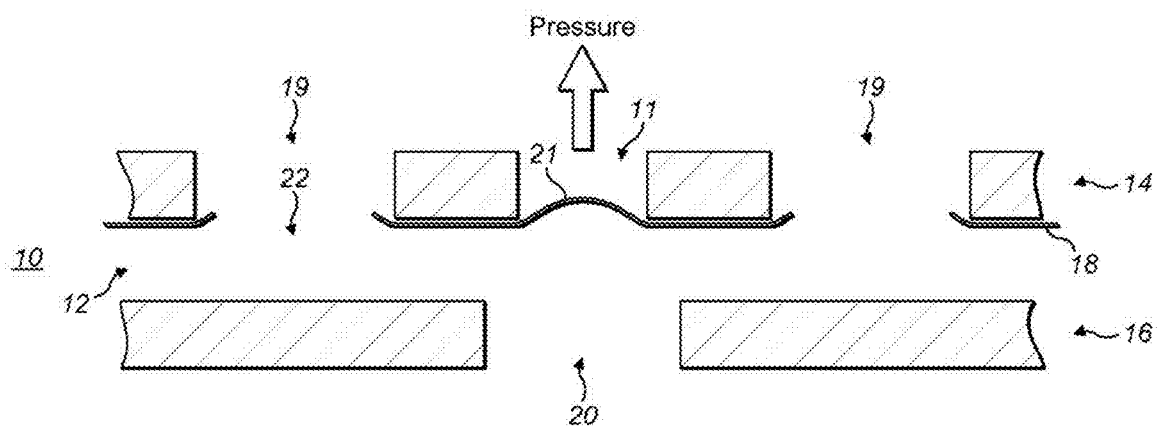

When a force is asserted against the second surface 15 of the flap 18, the flap 18 is motivated away from the sealing plate 16 towards the open plate 14, as shown in FIG. 4C. The valve 10 is now in an "open" position allowing fluid to flow through it via a fluid pathway formed between the sealing plate 16, the cavity 12, and the open plate 14. The valve flap 18 may further be biased towards either the open plate 14 or sealing plate 16.

Due to the flexible nature of the flap 18, when it is forced against either the open plate 14 or the sealing plate 16, span portions 21 of the flap 18 that are arranged to cover one or more holes 19, 20 in the plates 14, 16 will flex or distort under the pressure differential in the direction of the asserted force. For example, a span portion 21 of the flap 18, which covers the release hole 11 in the open plate 14 and one of the holes 20 in the sealing plate 16, when the flap is motivated between the two plates 14, 16, respectively, will flex into each of those holes 11, 20 when the flap 18 impacts or is in contact with the respective plate 14, 16, as shown in FIGS. 6B and 6C.

Figure 5:
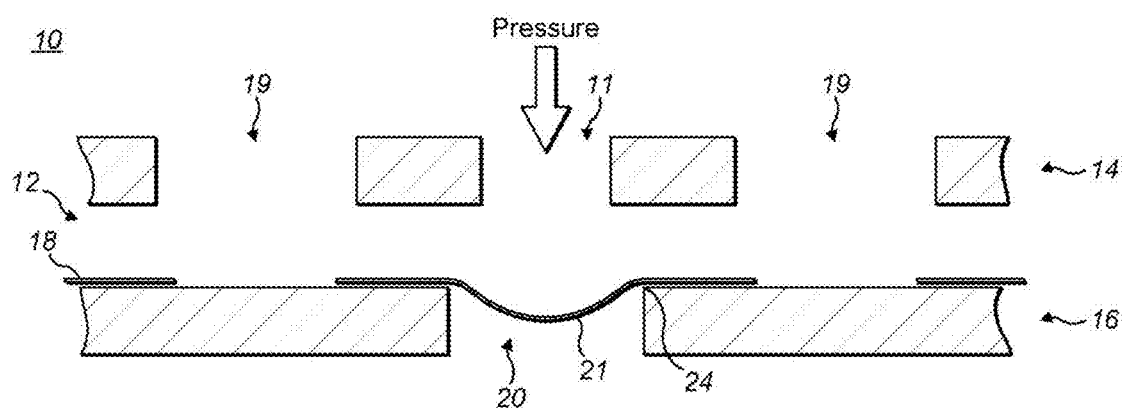
FIG. 5 shows a schematic cross-section view of a valve in a closed position.
Figure 6:
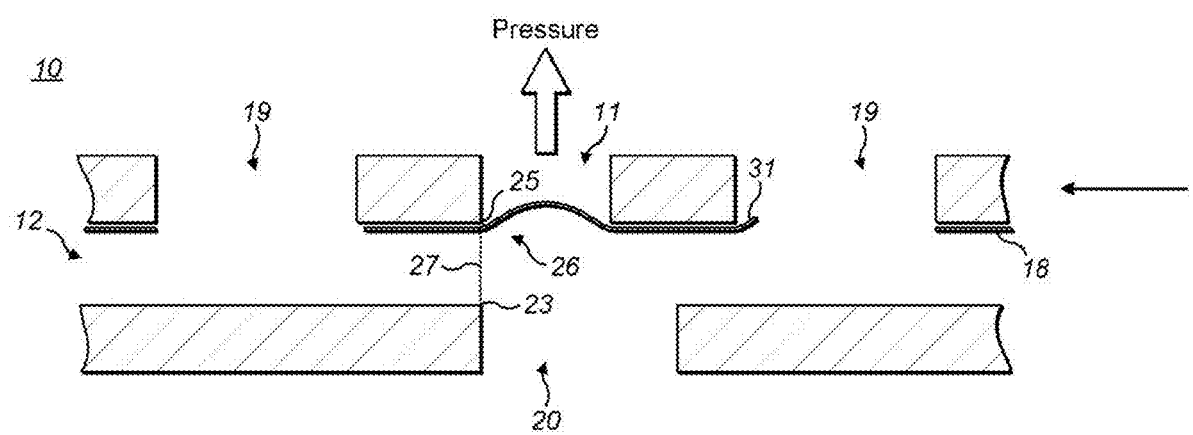
FIG. 6 shows a schematic cross-section view of a valve with misaligned plates in an open position.

As also shown in FIGS. 5 and 6, when impacting or in contact with a plate 14, 16, the unsupported span portion 21 of the valve flap 18 becomes distorted under the pressure differential and deforms (e.g. is forced) partially into the release hole 11 of the open plate 14 and a hole 20 of the sealing plate 16, depending on whether the pressure differential is causing the valve 10 to be opened or closed.

When in the closed position, as shown in FIG. 5, there is a high wear point 24 on the valve flap 18 at the edge of the hole 20 in the sealing plate 16. At this point 24 (or "impact region"), significant physical abrasion on the flap 18 can occur due to the impact of the flap 18 with the sharp, etched hole edge at high frequencies. The effect of the fluid pressure on the flap 18 may also cause the flap 18 to be dragged across the sharp hole edge and partially into the hole 20 as it is forced against the sealing plate 16. Cyclic fatigue as the flap 18 is repeatedly deformed over the edges of the holes 20 in the sealing plate 16 also causes increased level of wear.

In FIG. 6, there is misalignment between the open plate 14 and the sealing plate 16. When the valve 10 is in the open position, as shown, there are wear points 26 on the other side of the valve flap 18 at the edge of the open plate 14 where the valve flap 18 is unsupported. Misalignment between the open plate 14 and the sealing plate 16, as a result of assembly tolerances for example, may also give rise to increased wear of the valve flap 18 in the region 31 of the valve flap 18 close to the valve flap hole 22 where portions of the flap 18 are unsupported by the open plate 14. Misalignment between the open plate 14 and the sealing plate 16 also results in high wear points arising where the sealing hole edges 23 and the edges 25 of the release hole 11 may coincide, as illustrated by a dotted line 27, which will cause both sides 15, 17 of the valve flap 18 to be worn away on at the same point i.e. at the coinciding wear points 26 on the valve flap 18.

To inhibit, reduce or otherwise minimise valve failure caused by failure of the valve flap 18 through wear or fatigue, as described above, the flap 18 may be protected from the sharp edges 20a, 19a of the holes 20, 19 in the etched plates 16, 14 by providing a coating on at least one of the sealing plate 16 and open plate 14 in the region of the sharp edges 20a, 19a. The coating is arranged to control the distribution of one or more forces asserted on the flap 18 when the flap 18 impacts or is in contact with the open plate 14 or sealing plate 16 by controlling the areas of the flap 18 over which said forces are asserted to inhibit wear of said flap 18 at said areas.

Figure 7A:
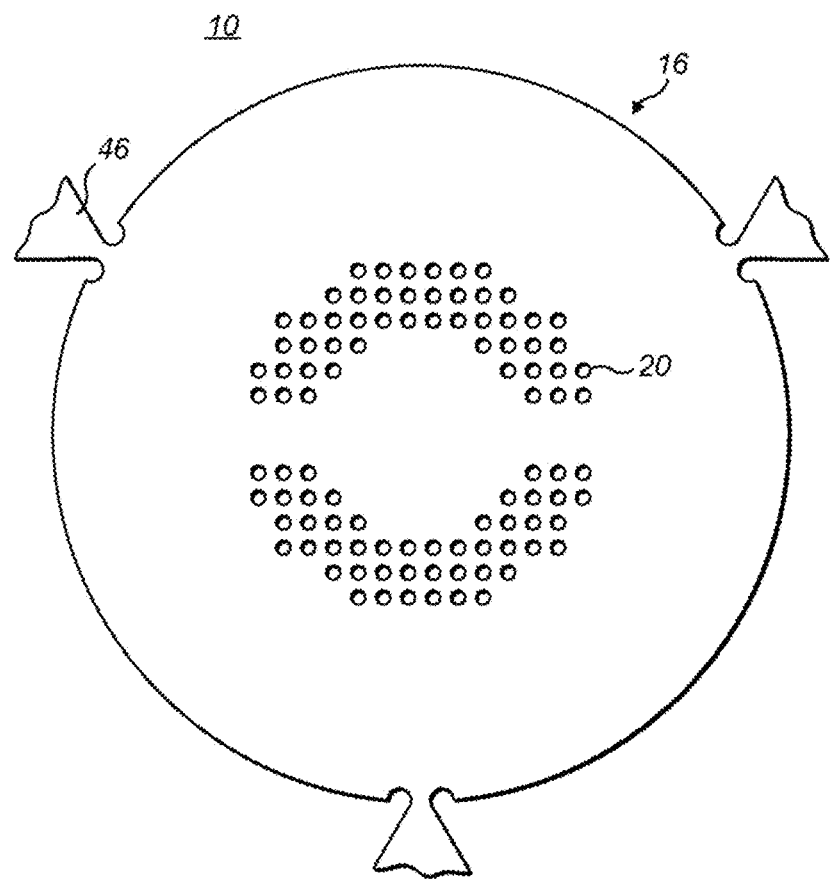
FIGS. 7A and 7B show a schematic top view and a cross-sectional view of an uncoated valve.
Figure 7B:
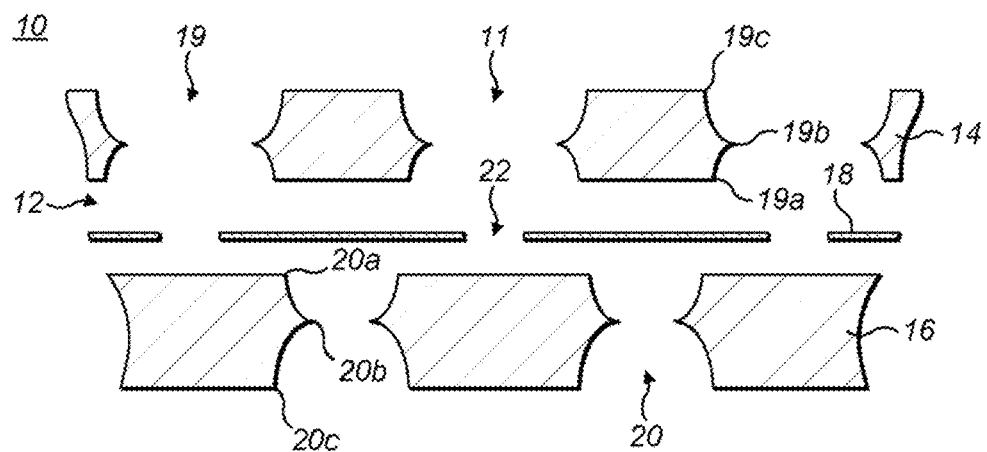

Another aspect of the problem is exemplified in FIGS. 7A and 7B. FIG. 7A shows a top view of a sealing plate 16 of a valve 10 suitable for use in the pump 100 of FIG. 2, illustrating the holes 20 in the sealing plate 16. A close-up section view of the valve 10 is shown in FIG. 7B, which includes an open plate 14 with holes 19, a sealing plate 16 with holes 20, and a valve flap 18 with holes 22. One embodiment of the valve 10 uses chemical etching to form the open plate 14 and sealing plate 16. The chemical etching process gives rise to hole profiles having typically "sharp" hole edges 19a, 19c, 20a, 20c, and a narrowing of the holes 19, 20 at edges 19b, 20b, as shown in FIG. 7B.

When the valve 10 is in the closed position, with the valve flap 18 in contact or close to the sealing plate 16, there is a high wear point on the valve flap at the edge 20a of the hole 20 in the sealing plate 16. At this edge 20a there is significant physical abrasion on the flap 18 due to the high frequency impact of the flap 18 with the sharp edge 20a of the hole 20. The effect of the fluid pressure on the flap 18 causes the flap 18 to be dragged across the sharp edge and partially into the hole 20 as it is forced against the sealing plate 16. Cyclic fatigue as the flap 18 is repeatedly bent over the edges of the sealing plate 16 also causes increased level of wear.

When the valve 10 is in the open position, with the valve flap 18 in contact or close to the open plate 14, there is a high wear point on the valve flap 18 at the edge 19a of the hole 19 in the open plate 14. At this edge 19a, there is significant physical abrasion on the flap 18 due to the high frequency impact of the flap 18 with the sharp edge 19a of the hole 19.

Figure 8A:
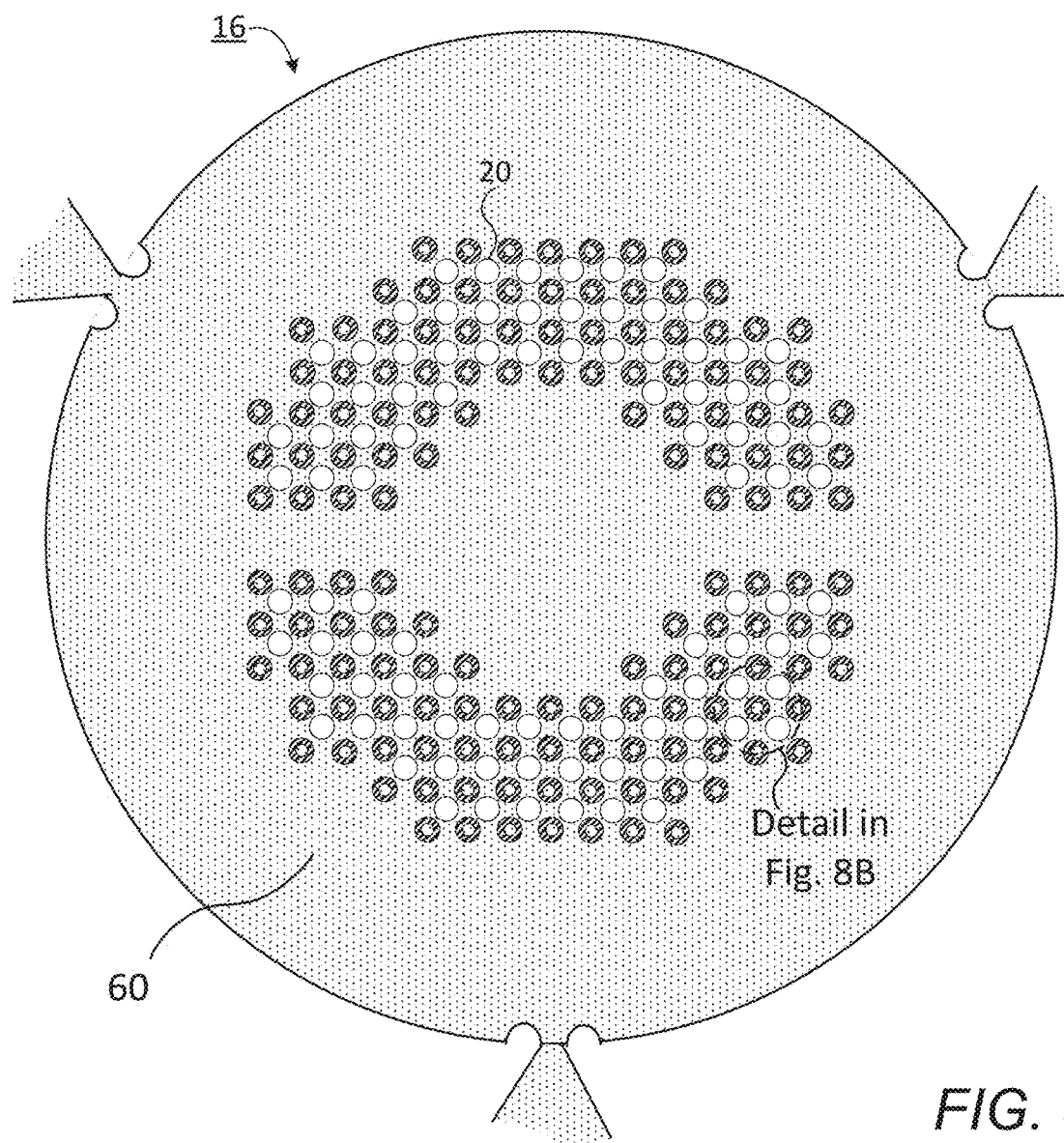
FIGS. 8A, 8B and 8C show schematic views of a valve having a coating.
Figure 8B:
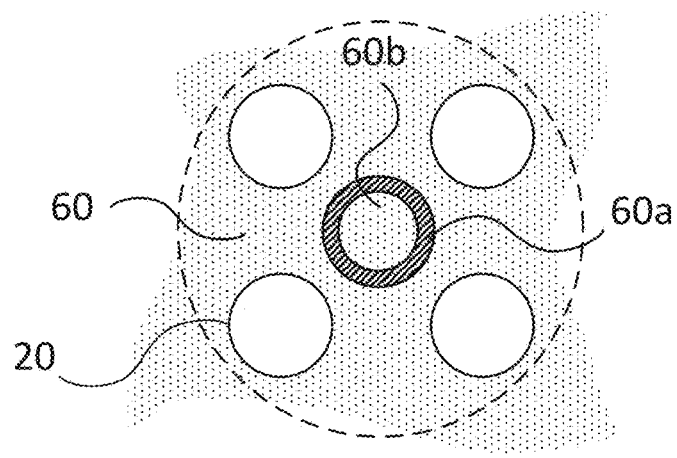
Figure 8C:
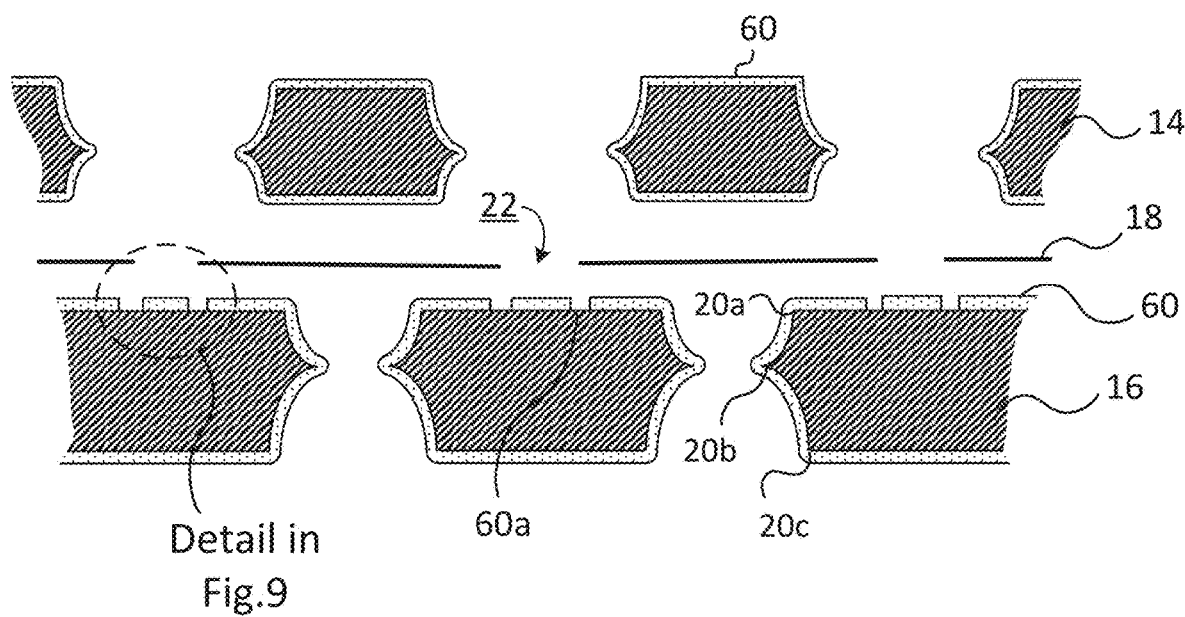

FIGS. 8A, 8B and 8C illustrate a valve which can alleviate or ameliorate the above-identified issues. FIG. 8A shows a schematic top view of a sealing plate 16 having a plurality of holes 20 with a coating 60 applied on the plate. FIG. 8A shows the plurality of holes 20 arranged in a pattern, while FIG. 8B shows an enlarged unit cell of the pattern in FIG. 8A. FIG. 8C shows a cross-sectional view of the coating 60 applied over the sharp etched edges 20a, 20b and 20c of hole 20 in the sealing plate 16. Each of the plates 14, 16 includes an inner surface which faces the other respective plate, and an external surface which is on an opposing side of the plate to the inner surface.

The coating 60 provides a rounded edge and compliant surface which will reduce the rate of deceleration of the valve flap 18 when it hits the sealing plate 16. The coating 60 also provides a sacrificial layer which may be softer than the valve flap 18, and which will wear preferentially to the valve flap 18. The coating 60 applied to the open plate 14 may provide similar features and effects. The coating 60 may be a "hard" coating, for example comprising Copper or Chromium Nitride, or a "soft" coating, for example comprising Parylene. In one embodiment of the valve 10, the coating 60 may be vacuum-deposited Parylene or another soft polymeric material. A soft (e.g. polymeric) coating 60, such as Parylene, may be preferred because the softer material will provide a reduced impact force on the areas of the flap 18 contacting it, with the added benefit of the coating 60 effectively burying the potentially sharp etched edges of the holes 19, 20 on the plates 14, 16. Any suitable process can be used to coat the plates including, but not limited to, electroplating, electrodeposition, sputtering, chemical vapour deposition, or spin coating.

As shown in FIGS. 8A, 8B and 8C, the sealing plate 16 includes a plurality of clearance regions 60a (also referred to as regions or boundary areas) in which the coating 60 is partially or fully absent. In this embodiment, the thickness of the coating is reduced to zero in the clearance regions. In other embodiments, the thickness of coating is reduced to a non-zero thickness through partial removal or thinning. The clearance regions 60a are regions where the holes 22 in the flap 18 are formed, and the clearance regions are shaped to minimise or inhibit contact between edges of the holes 22 in the flap 18 and the coating 60. This helps to inhibit formation of any bond between the flap 18 and the coating 60.

The clearance regions 60a each define an inner region 60b of the sealing plate 16 in which the coating 60 is retained. This means that the thickness of coating in the inner region 60b is generally greater than the thickness of coating in the clearance region 60a. The thickness of the coating in the inner region 60b, in this example, is substantially the same as the thickness of the coating 60 outside of the clearance region 60a. The inner regions 60b are areas of the sealing plate 16 which are aligned with, and smaller than, the corresponding holes 22 in the flap.

The clearance regions 60a are substantially aligned with the holes 22 in the valve flap 18, and are larger in diameter than the holes 22 in the valve flap 18. This has the effect of preventing or inhibiting the formation of any unintentional bond between the valve flap 18 and the coating 60, for example during UV laser ablation of the holes 22 in the valve flap 18. The clearance region 60a acts as a clearance hole for the edges of the holes 22 in the valve flap 18. The holes 22 may be formed by UV laser ablation (or similar techniques) of selective regions of the flap 18 while it is resting against the sealing plate 16. The presence of a (e.g. Parylene) coating 60 in contact with the underside of a (e.g. Polyethylene terephthalate (PET)) valve flap 18 can lead to mixing or weak adhesion of the two materials (which may both be polymeric) at the edges of the hole 22 during the UV ablation, which may reduce the mobility and response speed of the flap 18.

By retaining the inner region coating, rather than completely removing the coating inside the clearance region 60a, it's possible to achieve a significant reduction in the volume of material to be removed, e.g. by UV ablation. This minimises heat damage due to the high thermal energy transferred to the sealing plate 16, which may lead to thermal damage to the coating 60 elsewhere on the sealing plate 16. It also minimises system contamination or damage to the coating removal system, by the removed material condensing on optics or other critical systems. The clearance regions 60a are shaped to provide the desired effect of preventing contact and adhesion between the coating 60 with the underside of the flap 18 during laser ablation, while reducing the total amount of material which has to be removed from the sealing plate 16.

In this embodiment, the clearance regions 60a are annular in shape and are arranged in a pattern corresponding to the pattern of holes 22 in the valve flap 18. The clearance regions 60a are also shaped to complement the holes 22 in the valve flap 18. In this embodiment, each clearance region fully bounds its respective inner region. This means that each inner region forms an island of coating which is isolated from the rest of the coating by its defining clearance region.

More generally, the clearance regions 60a may be any appropriate shape.

Figure 9:
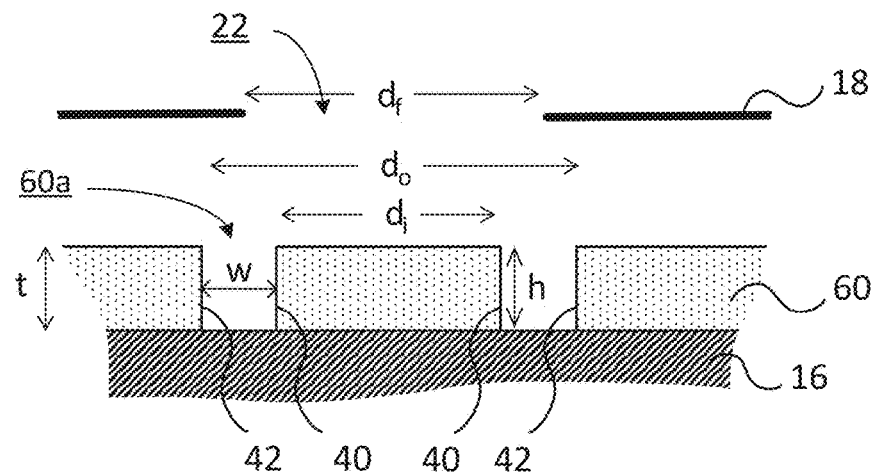
FIG. 9 is a detail view of FIG. 8C.

FIG. 9 is a detail view of FIG. 8C, showing dimensions of the clearance region 60a. The hole 22 in the flap 18 has a diameter of $d_f$.

The clearance region 60a is defined by an inner wall 40 and an outer wall 42 of the coating. The clearance region 60a has an outer diameter $d_o$, and inner diameter $d_i$, and a depth of h. The outer diameter $d_o$ is the distance (or maximum distance) between opposing outer walls 42, and the inner diameter $d_i$ is the distance (or minimum distance) between opposing inner walls 40.

The difference between the outer diameter $d_o$ and the inner diameter $d_i$ defines a width w of the clearance region. Generally, $d_o - d_i = 2w$. The distance (or maximum distance) between the inner and outer walls corresponds to the width, w.

In this embodiment the thickness of the coating 60 is t, and the thickness of the coating in the inner region is also t. As can be seen, in this embodiment, the depth of the clearance region h is the same as the thickness of the coating t, therefore h=t.

As shown, the outer diameter $d_o$ of the clearance region 60a is greater than the diameter $d_f$ of the respective hole of the flap with which the clearance region 60a is aligned. Furthermore, the inner diameter $d_i$ of the clearance region 60a is less than a diameter of a respective hole of the flap with which the clearance region is aligned.

The clearance region 60a is aligned with the edges of the hole 22, such that the edges are between (preferably midway between) the inner and outer walls 40, 42, of the clearance region 60a. The diameter $d_f$ of the hole 22 will be (preferably) midway between diameters $d_o$ and $d_i$.

The alignment between each clearance region 60a and its respective hole 22 in the flap 18 may not be perfect—e.g. the centre of the clearance region 60a may not exactly align with the centre of the respective hole 22 (although they are substantially aligned). To account for this, the difference between the outer diameter $d_o$ and the inner diameter $d_i$ is sufficient to accommodate alignment errors of the flap 18 and the sealing plate 16.

Exemplary ranges of the inner and outer diameters $d_o$ and $d_i$ are as follows:

$d_o-d_f<60$ μm, more preferably $d_o-d_f<30$ μm
$d_f-d_i<60$ μm, more preferably $d_f-d_i<60$ μm
$d_f$ is around 140 μm, $d_i$ is around 120 μm, $d_o$ is around 160 μm.

Figure 10:
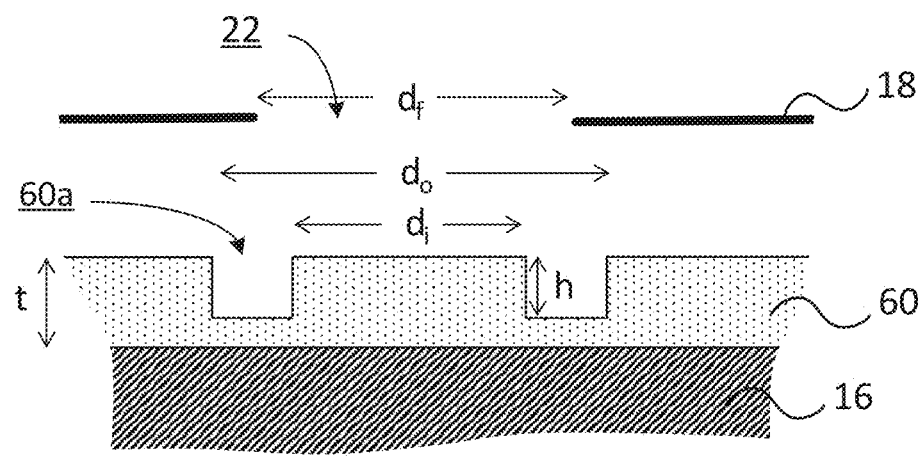
FIG. 10 is a detail view similar to FIG. 9, showing another embodiment.

FIG. 10 is a detail view similar to FIG. 9, showing another embodiment in which the coating in the clearance region 60a has been thinned (e.g. partially removed) rather than completely removed. Therefore, in this embodiment, the depth of the clearance region, h, is not the same as the thickness of the coating t, as h is less than t. Generally, $0<h<t$. Furthermore, h/t may be between 20% and 80%.

Figure 11:
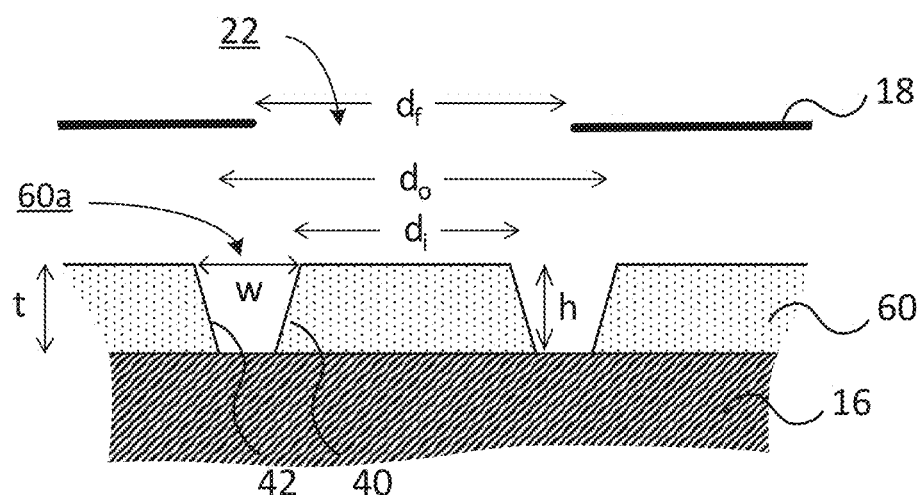
FIG. 11 is a detail view similar to FIG. 9, showing yet another embodiment.

FIG. 11 is a detail view similar to FIG. 9, showing another embodiment in which the inner and outer walls are angled, such that the clearance region 60a cross section approximates a trapezoid.

Figure 12:
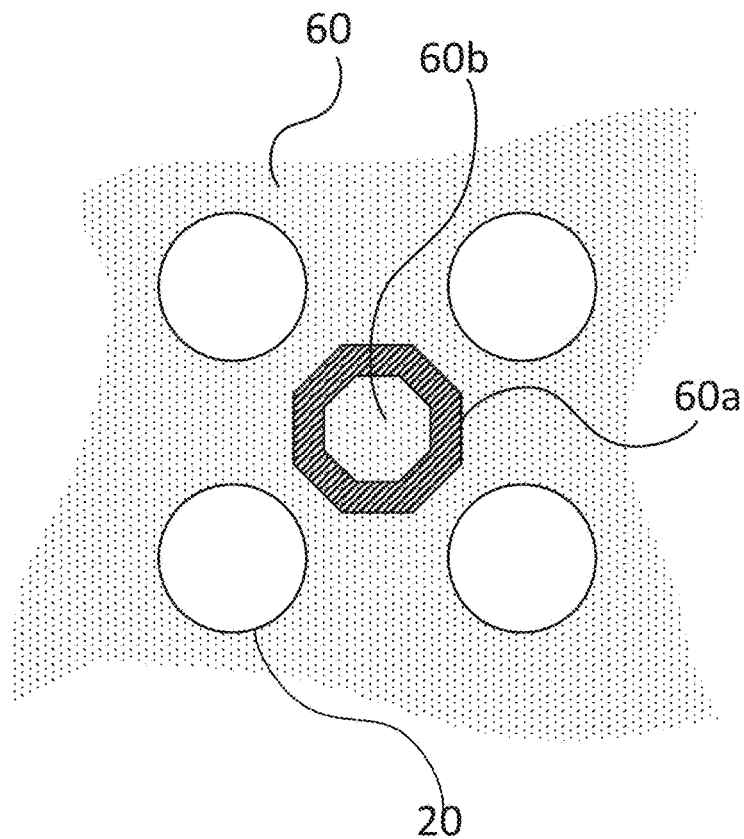
FIG. 12 is an enlarged unit cell of a pattern on a sealing plate according to another embodiment.

FIG. 12 is an enlarged unit cell of a pattern on the sealing plate 16 according to another embodiment. In this embodiment, the clearance region has an approximately octagonal shape, where both the inner and outer walls approximate an octagon in plan view.

Figure 13:
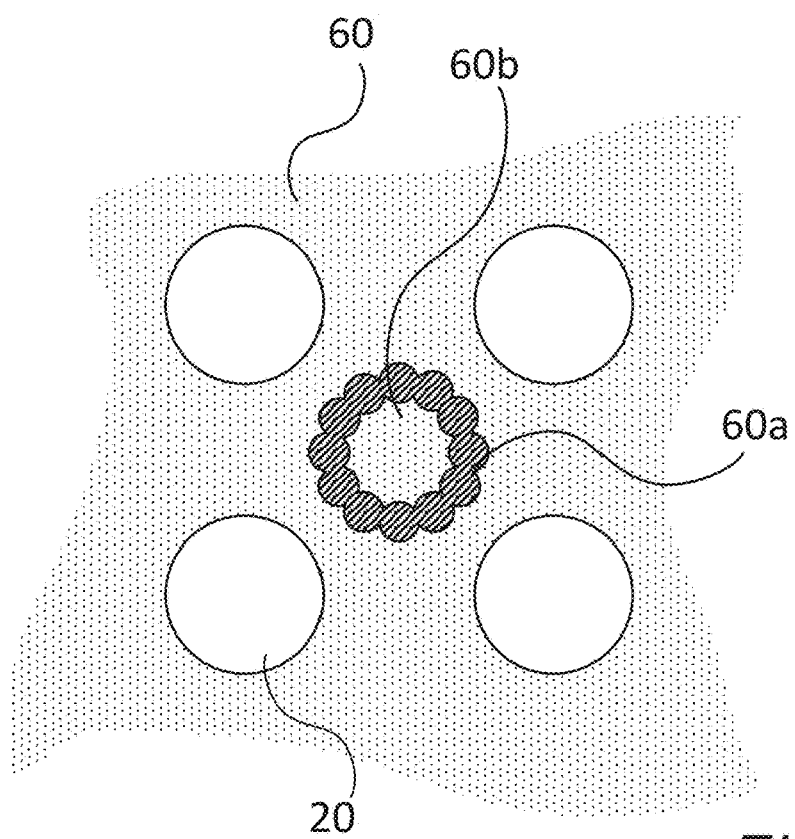
FIGS. 13 to 15 are enlarged unit cells of patterns on a sealing plate according to three further embodiments.

FIG. 13 is an enlarged unit cell of a pattern on the sealing plate 16 according to yet another embodiment. In this embodiment, the inner and outer walls 40, 42, of the clearance region are non-circular. The clearance region 60a is formed as a series of overlapping unified cylinders, arranged in an approximate annulus.

Figure 14:
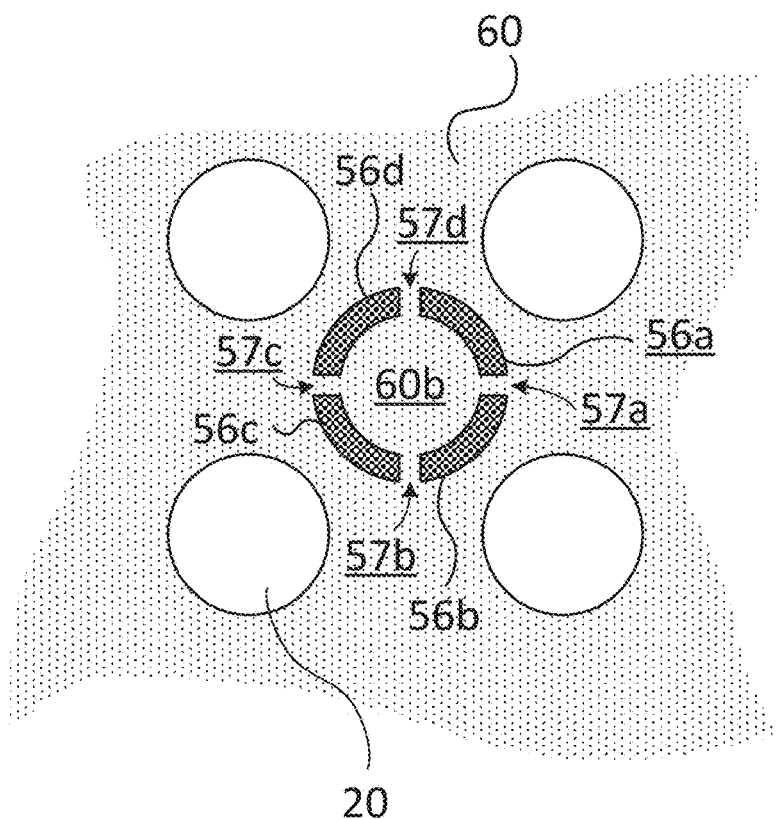

FIG. 14 is an enlarged unit cell of a pattern on the sealing plate 16 according to yet another embodiment. In this embodiment, the clearance region comprises four sub-regions 56a, 56b, 56c, 56d. The sub-regions are separated by four support regions 57a, 57b, 57c, 57d of the clearance region in which the thickness of the coating is not reduced. Therefore, the coating in each support region has the same thickness as the rest of coating 60. The support regions extend between the coating 60 outside the clearance region and the inner region 60b. Each of the sub-regions are arcuate in shape and generally the clearance region has a substantially annular shape in a similar way to the embodiment shown in FIG. 8B.

It will be appreciated that the flap may come into contact with the support regions 57a, 57b, 57c, 57d during valve manufacture and use. The support regions 57a, 57b, 57c, 57d provide some support to the valve flap, reducing the extent to which the flap bends into the clearance region 60a. The clearance region, made up of the four sub-regions 56a, 56b, 56c, 56d, still inhibits contact between edges of holes of the flap and the coating in the areas where the sub-regions align with the hole edges. The arrangement of sub-regions and support regions is configured to inhibit formation of any bond between the flap 18 and the coating 60. For example, the sub-regions 56a, 56b, 56c, 56d of the clearance region correspond to a larger proportion of the circumference of the flap hole than the support regions (e.g. the clearance region aligns with at least 75% of its respective hole edge) which means that the propensity of the valve flap to adhere to the coating is limited.

Providing the support regions also allows a further reduction in coating material to be removed.

The support regions may also be beneficial when forming the clearance regions using a mask, since the mask can include tabs which correspond to the support regions, and which connect to the area of the mask defining the inner region 60b.

In some embodiments, the coating in sub-regions 56a, 56b, 56c, 56d may be reduced but not fully removed—for example in the sub-region the height of the clearance region may be t/2. The sealing plate may include any number of sub-regions in any shape, as long as the clearance region still functions to inhibit contact and/or adhesion of the flap and the coating 60.

Figure 15:
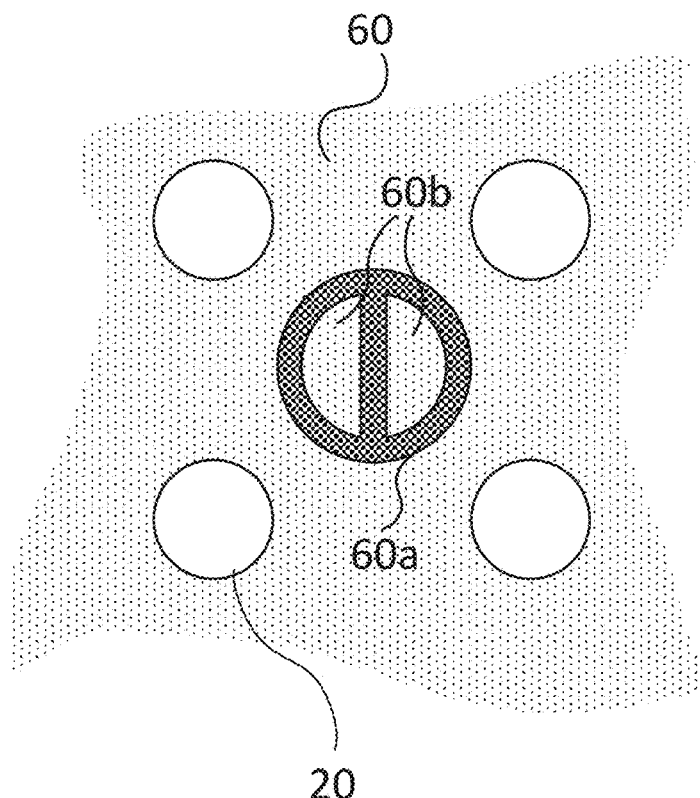

FIG. 15 is an enlarged unit cell of a pattern on a sealing plate 16 according to yet another embodiment. In this embodiment, the clearance region 60a includes an additional area in which coating is reduced and/or removed, the additional area extending between opposing sides of the clearance region 60a and shaped as an elongate rectangular channel. This formation of the clearance region defines an inner region 60b including two separated areas, or islands, of coating.

It will be appreciated that each clearance region can partially or fully bound its respective inner region.

Other choices of clearance region shape may be used, so long as the clearance region shape is substantially similar to the shape of the valve hole. This ensures that a minimal area of material is removed, whilst still preserving the function of the clearance region.

In forming the clearance regions, different regions of the coating 60 may be removed or thinned to different extents, and the transition between these regions may be step changes, tapered transitions or any other transition.

As can be seen from the Figures, each of the clearance regions may comprise a channel in the coating, where the channel is aligned with an edge of the respective hole of the flap. Therefore, the channel is shaped to minimise contact between the edge the respective hole and the coating.

Modifications and Alternatives

Removal of coating may be achieved by any appropriate technique, including, but not limited to removal by laser ablation, melting, abrasion, or etching.

In some aspects, the inner surface of only one of the plates, instead of both plates, may be coated. For example the inner surface of the sealing plate 16 may be coated while the inner surface of the open plate 14 is not. In other aspects, both the internal and external surfaces of one plate will be coated while the internal and external surfaces of the other plate remain uncoated. For example, both the internal and external surfaces of the sealing plate 16 can be coated while the internal and external surfaces of the open plate 14 remain uncoated.

The force asserted on the valve flap may be force asserted on the flap by the fluid in response to a change in direction of the differential pressure of the fluid across the valve. Alternatively, or additionally, the first plate or second plate may apply a force to the valve flap when it impacts thereon or contacts therewith. Thus, said force may comprise one or more forces asserted on (or applied to) the valve flap in one or more directions by one or more aspects of the valve.

As referred to herein, a "coating" preferably connotes at least one layer of material suitable for providing a coating when applied, for example, to the or each plate of the valve.

The coating may be formed from any suitable material including, without limitation, metal, ceramic, glass, or plastic. Preferably, the coating is formed of a material with a lower hardness than the valve flap. Hardness may be measured, for example, by Rockwell, Brinell or Vickers hardness tests. The flap may be formed of Polyethylene terephthalate (PET). The coating may be formed of Parylene or another soft polymeric material.

In a preferred embodiment, the valve may be suitable for operating at frequencies of 20 kHz or higher. The diameter of the plurality of first and/or second holes extending through the first and/or second plates may be less than 500 µm. Preferably, the diameter of said holes is less than 200 µm; more preferably, the diameter of said holes is less than 150 µm. In some embodiments, the plurality of first and/or second holes extending through the first and/or second plates may have a diameter in the range 130-140 µm. In other embodiments said holes may have a diameter of 100 µm.

The valve flap may have a thickness of less than 45 µm. Preferably, the valve flap has a thickness of less than 10 µm; more preferably, the valve flap has a thickness of less than 5 µm. In some embodiments the valve flap may have a thickness in the range 2-3 µm. In other embodiments, the valve flap may have a thickness of 1-4 µm. Preferably, the mass per unit area of the valve flap is less than 60 g/m².

The coating may have any suitable thickness. Preferably the coating may have a thickness less than the radius of the holes in the valve to prevent the holes becoming blocked. More preferably the coating thickness should be optimised to reduce the narrowing of the holes whist providing adequate protection to the valve flap in use and minimising the impact on the production processes.

Preferably, the thickness of the coating 60 may be less than the radius of the holes 20 in the sealing plate 16 to prevent the holes closing at the narrowed region 20b. The coating may have a thickness of less than 100 µm, more preferably a thickness of less than 10 µm, and even more preferably a thickness of around 4 µm.

Preferably, the pump comprises a first base and a second base connected by at least one side wall to define an internal pump cavity. For example, the first and second bases may be generally circular and the at least one side wall may be generally cylindrical.

Preferably, an actuator is disposed between the first base and second base. The actuator may be arranged to separate said internal pump cavity into two separate pump cavities such that fluid cannot pass between the two cavities via the actuator. The two pump cavities may therefore comprise a first cavity defined between the first base and the actuator, and a second cavity defined between the second base and the actuator.

Preferably, the pump comprises at least one aperture provided in each of the first base and the second base, in which is provided a valve as described herein, such that each of said at least one aperture may be described as a "valved aperture". Preferably, each valve is configured to allow fluid to flow in only one direction, and can therefore be described as a "one-way" valve.

It will be understood that any apparatus feature described herein may be provided as a method feature, and vice versa. Furthermore, any feature in a particular aspect or embodiment described herein may be applied to another aspect, in any appropriate combination. It should also be appreciated that particular combinations of the various features described and defined in any aspects described herein can be implemented and/or supplied and/or used independently.

As previously noted, it will be understood that the present invention has been described above purely by way of example, and modifications of detail can be made within the scope of the invention. Thus, while the foregoing is directed to exemplary aspects and embodiments of the present invention, other and further aspects and embodiments of the invention will be apparent to those skilled in the art from consideration of the specification, and may be devised without departing from the basic scope thereof, which is determined by the claims that follow.

The aspects and embodiments disclosed herein are described in sufficient detail to enable those skilled in the art to practice the invention, and it is understood that other embodiments may be utilized and that logical structural, mechanical, electrical, and chemical changes may be made without departing from the scope of the invention.

The invention claimed is:

1. A valve for controlling fluid flow, the valve comprising:
   a first plate comprising a plurality of first holes extending through said first plate;
   a second plate comprising a plurality of second holes extending through said second plate, the plurality of second holes being substantially offset from the plurality of first holes of said first plate;
   wherein said first plate and said second plate are arranged to form a cavity therebetween in fluid communication with the plurality of first holes of said first plate and the plurality of second holes of said second plate; and
   a flap disposed and moveable between said first plate and said second plate, said flap having holes substantially offset from the plurality of first holes of said first plate and substantially aligned with the plurality of second holes of said second plate;
   wherein said flap is operable to be motivated between said first and second plates in response to a change in direction of differential pressure of the fluid across the valve;
   wherein said first plate comprises a coating disposed on a surface of the first plate;
   wherein the first plate comprises a plurality of clearance regions, substantially aligned with the holes of the flap, in which a thickness of the coating is reduced; and
   wherein each of the plurality of clearance regions defines a respective inner region in which a thickness of the coating is generally greater than its defining clearance region.

2. The valve of claim 1, wherein the plurality of clearance regions are arranged to inhibit contact between edges of the holes of the flap and the coating.

3. The valve of claim 1, wherein the plurality of clearance regions are arranged to inhibit contact between edges of the holes of the flap and the coating during formation of the holes of the flap.

4. The valve of claim 1, wherein each of the clearance regions is substantially aligned with a respective hole of the flap and shaped to complement said respective hole of the flap.

5. The valve of claim 4, wherein the respective hole of the flap is substantially circular in shape and wherein each clearance region is substantially annular in shape to complement the respective hole of the flap.

6. The valve of claim 1, wherein the thickness of the coating in the inner region is substantially the same as the thickness of the coating outside of the clearance region.

7. The valve of claim 1, wherein, for each clearance region, an outer diameter of the clearance region is greater than a diameter of a respective hole of the flap with which the clearance region is substantially aligned.

8. The valve of claim 1, wherein, for each inner region, a diameter of the inner region is less than a diameter of a respective hole of the flap with which the inner region is aligned.

9. The valve of claim 1, wherein, in each clearance region, the thickness of the coating is zero.

10. The valve of claim 1, wherein each inner region comprises at least one island of coating isolated from a rest of the coating by its defining clearance region.

11. The valve of claim 1, wherein the coating is less hard than the flap.

12. The valve of claim 1, wherein the coating is arranged to control the distribution of one or more forces asserted on said flap when said flap impacts or is in contact with said first plate by controlling areas of the flap over which said forces are asserted to inhibit wear of said flap at said areas.

13. The valve of claim 12, wherein said areas of the flap over which said forces are asserted are areas of said flap that impact or contact regions of said first plate adjacent said first holes.

14. The valve of claim 1, wherein the coating extends at least partially into the plurality of first holes of said first plate to cover at least part of an internal surface of the plurality of first holes.

15. The valve of claim 1, wherein the thickness of the coating is at least one of the following: less than 100 µm, less than 10 µm, and around 4 µm.

16. The valve of claim 1, wherein the coating comprises one of the following: a polymer, a soft polymeric material, and Parylene.

17. The valve of claim 1, wherein each clearance region lies between the plurality of first holes in the first plate such that the coating surrounds the plurality of first holes.

18. The valve of claim 1, wherein each clearance region comprises one or more separate sub-regions.

19. A pump comprising at least one valve according to claim 1.

20. A method of providing a first plate for a valve according to claim 1, the method comprising:
  applying the coating onto the surface of said first plate;
  at least partially removing the coating in each of the plurality of clearance regions of the first plate to form the plurality of clearance regions, substantially aligned with the holes of the flap, in which a thickness of the coating is reduced; and
  retaining the coating in each inner region defined by a respective clearance region of the plurality of clearance regions, in order that a thickness of the coating is generally greater in each inner region than its defining clearance region of the plurality of clearance regions.

* * * * *